A. L. King.
Flood Gate.
No. 98,071. Patented Dec. 21, 1869.
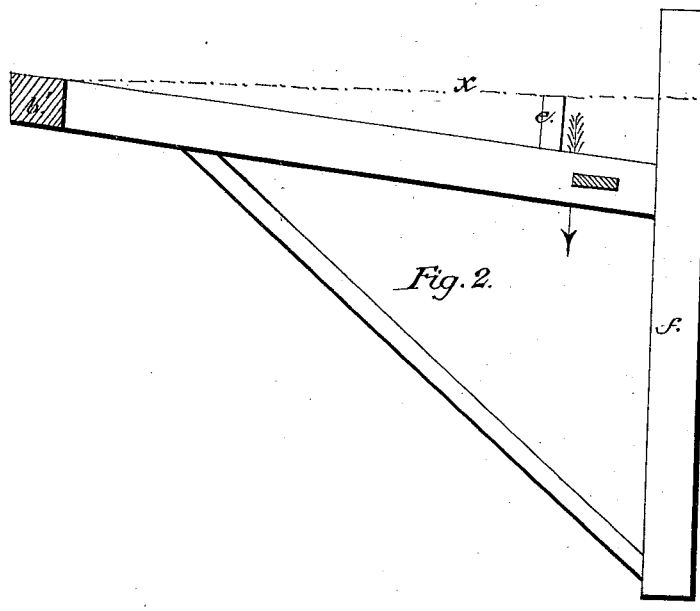
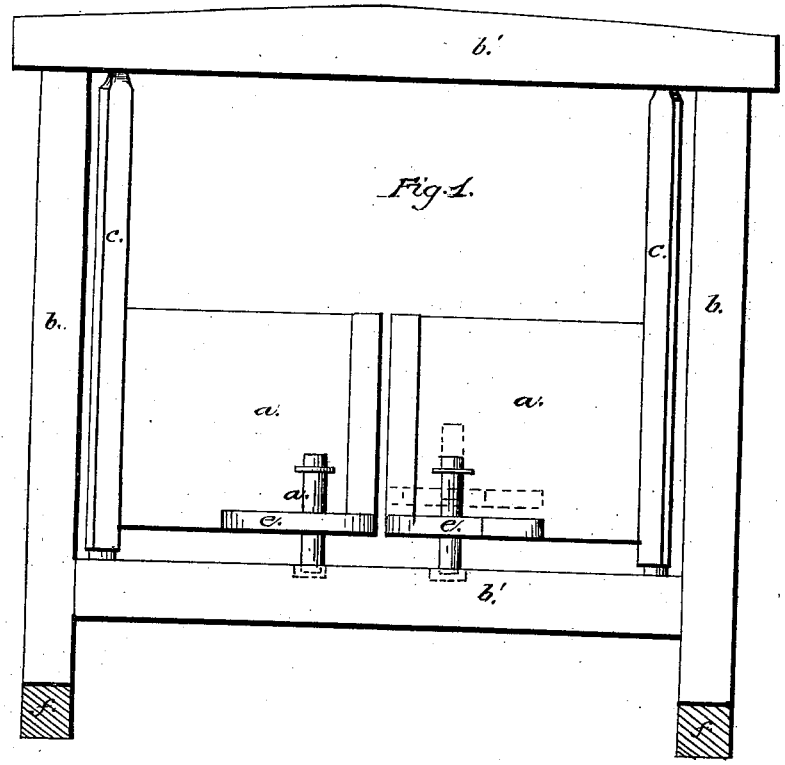
WITNESSES:
S. E. Peck.
A. J. Peck.
INVENTOR:
Abram L. King
per H. P. K. Peck
Attorney.

United States Patent Office.

ABRAHAM L. KING, OF FARMERSVILLE, OHIO.

Letters Patent No. 98,071, dated December 21, 1869.

IMPROVED FLOOD-GATE.

The Schedule referred to in these Letters Patent and making part of the same.

To all whom it may concern:

Be it known that I, ABRAHAM L. KING, of Farmersville, in the county of Montgomery, in the State of Ohio, have invented a new and useful Improvement in Flood-Gates; and I do hereby declare that the following is a full and exact description thereof, reference being had to the accompanying drawings, and to the letters of reference marked thereon.

Figure 1 represents a front view of my improved flood-gate, and

Figure 2 represents a side elevation of the frame thereof.

In the drawings, the gates $a$ $a$ are hung in the frame $b$ $b$ $b'$ $b'$ by the pivoted posts $c$ $c$, the ends of which are inserted in circular holes, formed in the two pieces $b'$ $b'$ of the gate-frame.

Each gate $a$ has connected to its front side an upright bolt, $d$, of wood, having a wooden float, $e$, attached to it.

The gate-frame $b$ $b'$ is mortised into sills $f$, which are designed to be sunk into the ground slightly, and braces may be used to extend from sills $f$ to the two side pieces or posts $b$ $b$ of the gate-frame.

The posts $b$ $b$ are mortised into the sills $f$, and stand at an angle of several degrees to a perpendicular line, as indicated by dotted line $x$, seen in fig. 2.

The frame $b'$ $b'$ $b$ $b$, with the gates $a$ $a$, is intended to be set in a stream of water, which may flow through farms or enclosed lands, and in the line of a fence, to prevent animals from passing to or from the enclosure.

The arrow A indicates the direction of the flow of water, which will pass through the gates, and also shows that the frame and gates stand inclining "up the stream."

Whenever the water in the stream rises to sufficient height to cause the floats $e$ to be elevated, the effect will be to raise the bolts $d$ $d$ out of the mortises in which their lower ends rest in the frame-piece $b'$, when the gates will be opened by the pressing current of descending water. But when the water subsides, the gates, being hung at a slight angle to the vertical line, they will swing around, and close together by their gravity, and the bolts $d$ $d$ will return to their mortises in frame-piece $b'$, by sliding up inclined planes, formed on the upper rear side of piece $b'$, in rear of the mortises, into which the lower ends of the bolts $d$ fall and rest, to fasten the gates in a closed position, until another flood rises in the stream in which the gate may be placed.

It will be seen that my improved flood-gates will be opened by the rising water, and will close themselves, and become fastened by the falling of same.

Also, that the entire frameway, in which the gates are hung, has no fixed central post, or other obstruction, to prevent the free passage of water and flood-wood, which may be carried along by the stream.

To prevent the gates from standing opened, studs may be fixed in the frame, to prevent the gates swinging around too far.

I deem my present invention an improvement upon my flood-gate, patented March 16, 1869.

Having fully described my invention,

What I claim, and desire to secure by Letters Patent, is—

The combination of gates $a$ $a$, provided with floats $e$ and bolts $d$, arranged in the inclined frames $b$ $b'$, and operating in the manner and for the purpose substantially as specified.

In testimony whereof, I have hereunto set my hand, this 13th day of May, A. D. 1869.

ABRAHAM L. KING.

Witnesses:
H. P. K. PECK,
A. S. PECK.